The specification in this patent is not in print.
6913X
G. Hotchkiss.
Grist Mill.
Patented Jan. 27, 1832.
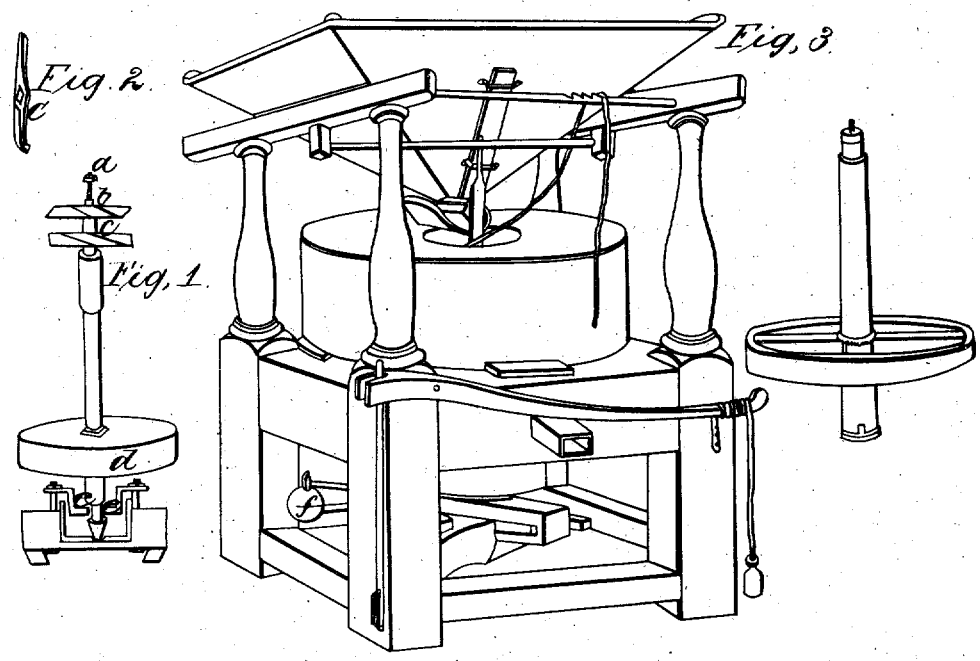

Gideon Hotchkiss.
Letters Patent.

The Schedule referred to in these Letters Patent and making part of the same containing a description in the words of the said Gideon Hotchkiss himself of his improvement in the Grist mill.

Be it Known that I Gideon Hotchkiss of the Town of Windsor in the County of Broome and the State of New York have made a new and useful improvement in the Grist mill which is described as follows. The principal objects to be effected by my improvement are to perform fast grinding with small stones without heating the flour thereby lessening the expense in erecting the mill and requiring less power to drive it. Also to improve Mills now in use by placing the hereinafter described Cylinder and flights in the eye of the Runner to keep the stones cool and to make the flour better. The frame on which the Stones are placed is made by framing together four posts one at each corner and eight girts, four of which to be of sufficient width to receive and support the beams bearing the stones and the flooring around the bed stone. One of the lower girts is of sufficient size to receive an end of the Bridge-tree inserted in a mortise in the same, the other end resting on the centre of the Brake moving on a joint inside of the opposite girt. On the middle of the Bridge-tree rests a key or tram block in which is secured the oil-pot or case. In the centre of the oil-case turns the foot or lower point of the spindle. The spindle is made of iron & steel with a flange or circular projection near the lower end. An iron lock-joint made in two parts encircles the spindle immediately above the flange or projection and is screwed to the frame block which secures the foot or point of the spindle in the Oil-case and prevents its escaping or bounding out therefrom. The spindle as high Drawing made 6913x Jan 27, 1832 as the collar and square part on which is [illegible] the Driver is made in
the usual manner. The shoulders of the Spindle above the
Driver are to be rounded off in a semi globular form on which
rests the Balance rind and Runner, the balance rind where
it rests on the semi globular shoulder being of a semispherical
concave shape, its upper side is convex: on which and around
the spindle is put a circular washer or lateral concave on its
under side resting on the balance rind. Above this is put a nut
screwed on the spindle the threads of which being cut in a con-
trary direction from the turning of the stone, the lateral may
be secured by a key passing through the spindle or it may
be otherwise fastened The spindle is connected and suspend-
ed from the Runner the latter being nicely balanced on
the spindle, having a motion similar to a ships compass
and whilst running constantly forming itself to the bed
stone in the nicest manner. The damsel is screwed
or otherwise fastened to the upper end of the spindle. —
A pulley whirl Drum or cog wheel is placed on the
spindle to drive the same, a weight is added to the spindle
in order to give greater power or gravity to the Runner when
required which therefore may be of smaller size and will move
with greater velocity thereby lessening the expense and power
required in constructing and driving the Mill. The Driver
and Balance rind are curved or twisted in such a manner
as to answer the purpose of flights or wings, which, during
the operation of the Mill, carry round and force the air which
is in the eye of the Runner between it and the bed stone
along deep channels cut in the runner or pipes inserted to distribute
the air and out at the circumference thereof also through grooves cut
on the periphery of a hollow cylinder inserted in the eye of the
runner creating a current of air — through these grooves and
a draught and a [illegible], or suction through the eye, causing a more free, easy and quick admission of the grain between the
stones The grain on entering the eye comes in contact with
two curved wings or projections on the inside of the cylinder
before mentioned When the smut or any other dirt, which may
be on the grain is separated from it, and being lighter than
the grain is carried by the currents of air through the grooves
out from the stones. Mills that grind fast are liable to heat
the flour and consequently injure it, but the currents of air,
created as before described, and driven between the stones prevent
this from taking place. To the brake may be attached a screw
or lighter staff in the usual way to raise or sink the Runner
at pleasure also near one end of the brake and on it are placed
weights and springs or a fulcrum supporting a lever attached
to one of the corner posts of the frame by a bolt passing thro'
one of its ends and having a weight suspended near the other
end in the manner of a steel yard by which the gravity
or power of the Runner may be increased or diminished
at pleasure, so that an equilibrium is formed between the
power required and power applied. The Hoop-Hopper Fram
Hopper and Shoe are made in the usual manner. What I
claim as my Invention and for which I solicit Letters
Patent is increasing the gravity of the Runner by means of
weight attached to the spindle or by means of the flange
near the bottom of the spindle and the lock joint fastened
to the frame block on the Bridge-tree with the lever and
weight acting on the same. the spindle passing through the
balance-rind secured to and suspended from the Runner,
the inserting wings or flights in the eye, the shape of the
driver and balance rind causing currents of air to pass
between the stones in pipes or otherwise and through grooves
on the circumference of a hollow cylinder placed within
the eye of the Runner carrying off the dirt and keeping 28. 6913X Jan 27, 1832 the stones from heating, likewise causing a draft thro' the eye which allows the grain to pass more freely to the grinding stones.

Done at the City of Washington this 24th day of January 1832

Witnesses
Wm G. Branch
Wm F. Elliot

Gideon Hotchkiss (1070 wds.)

Patented January 27. 1832.